2,149,112

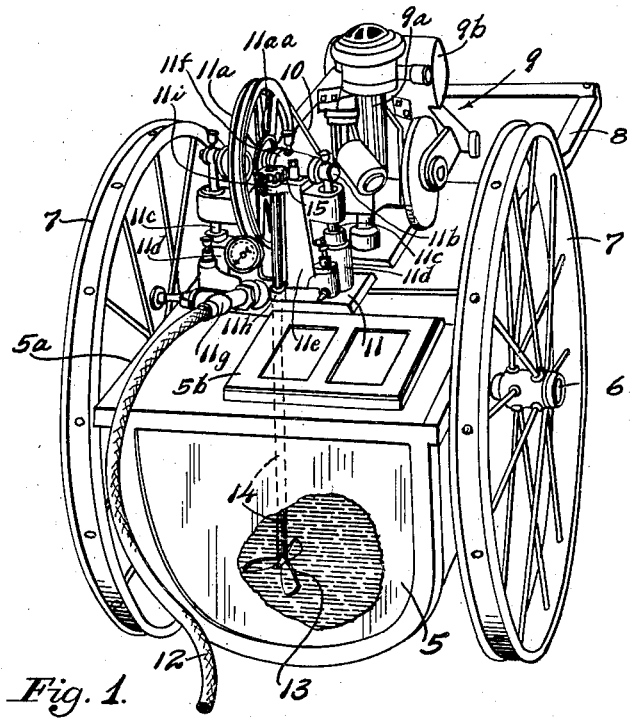
Fig. 1.
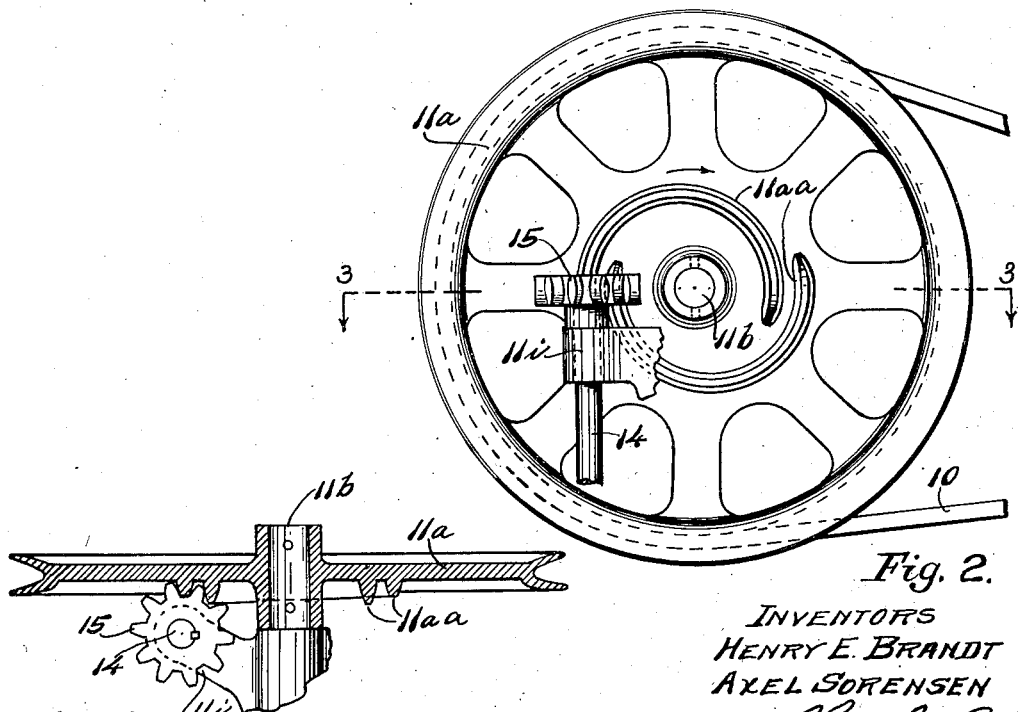
Fig. 2.
Fig. 3.
INVENTORS
HENRY E. BRANDT
AXEL SORENSEN
By Chas. C. Keif.
Attorney Patented Feb. 28, 1939

UNITED STATES PATENT OFFICE 2,149,112

AGITATOR DRIVE FOR POWER SPRAYERS

Henry E. Brandt and Axel Sorensen, North St. Paul, Minn., assignors to Dobbins Manufacturing Company, North St. Paul, Minn., a corporation of Minnesota Application May 23, 1936, Serial No. 81,437

2 Claims. (Cl. 299—45)

This invention relates to a spraying device and particularly to a portable power sprayer comprising a portable tank for containing the fluid to be sprayed, a discharge pump, a motor for driving said pump, an agitating means in said tank and means for driving said agitating means from said pump.

It is an object of this invention to provide a very simple and efficient means for driving said agitator from said pump.

It is a further object of the invention to provide such a portable power sprayer comprising a pump having a rotating member, an agitator in said tank, a member secured to said agitator and extending to a point adjacent said pump, an operating member on said last mentioned member and means on said rotating member for engaging and actuating said operating member to operate said agitator.

It is more specifically an object of the invention to provide a portable power sprayer comprising a tank, a rotatable agitator in said tank, a shaft secured to said agitator and extending to the exterior of said tank, a power operated pump on said tank having a rotating wheel, a gear on said shaft and means on said wheel meshing with said gear to rotate the same and operate said agitator.

These and other objects and advantages of the invention will be fully set forth in the following description made in connection with the accompanying drawing, in which like reference characters refer to similar parts throughout the several views and in which:—

Fig. 1 is a perspective view of a sprayer equipped with the invention disclosed and claimed herein;

Fig. 2 is a view in side elevation of a portion of a pump used; and

Fig. 3 is a vertical section taken on line 3—3 of Fig. 2 as indicated by the arrows.

Referring to the drawing, a portable power sprayer is shown comprising a tank or receptacle 5 adapted to contain the fluid or mixture to be sprayed. While this tank might take various forms, in the embodiment of the invention illustrated it is shown as having a flat top 5a and a substantially semicylindrical body. Said tank will be provided with a suitable removable closure shown as a rectangular door 5b. This door can be removed for the purpose of filling the tank. The tank 5 is supported on trunnions 6 forming axles for a pair of wheels 7. A handle 8 of rectangular form is secured to one end of the receptacle 5 by means of which it may be pushed or propelled as desired on the wheels 7. A motor 9 is mounted on the top 5a at one end thereof, which motor is illustrated as of the internal combustion type having one or more cylinders 9a and a fuel supply tank 9b. Said motor is equipped with a shaft carrying a driving pulley (not shown). A belt or chain 10 runs over said driving pulley and over a larger driven pulley or wheel 11a forming part of a pump 11 also mounted on top 5a. The pump 11 comprises a rotating horizontal shaft 11b carrying eccentrics which are connected to plunger rods 11c connected to plungers in the pump cylinders 11d. Said pump comprises a frame 11e having at its upper portion the bearings 11f for shaft 11b. The pump 11 has a discharge outlet 11g to which is connected a flexible hose 12 which will be equipped with a suitable spraying nozzle (not shown).

The receptacle 5 has disposed therein some distance above its bottom a rotatable agitator 13 and while this might take various forms, in the embodiment of the invention illustrated it is shown as a propeller having a plurality of helical blades and said propeller is preferably arranged to direct the fluid downwardly toward the bottom of the tank 5. A shaft 14 is connected to propeller 13 and extends upwardly through the top 5a, the same being journaled in a bearing 11h at the lower portion of frame 11e and in a bearing 11i adjacent the top of frame 11e. A gear 15 is secured to the upper end of shaft 14 and engages the upper end of bearing 11i. Gear 15 is disposed alongside and adjacent the pulley or wheel 11a. Gear 15 has quite a number of radially extending teeth and these teeth as seen from the face of the gear are rounded or tapered somewhat at their edges as shown in Fig. 2. The wheel 11a is provided on its side adjacent gear 15 with a pair of cams 11aa. Each of the cams 11aa is substantially semi-circular, having their ends somewhat tapered as seen in side elevation and said cams in section are tooth-shaped as shown in Fig. 3. With the wheel 11a rotating in the direction indicated by the arrow in Fig. 2 it will be seen that each cam has an end which will enter between the teeth of gear 15 and the end opposite this entering end will be called the exit end. As shown in Fig. 2 the cams are progressively a greater distance from the center of wheel 11a from their entering end to their exit end. Said cams are thus eccentric to wheel 11a. The cams 11aa are flared upwardly or made of greater height as they approach the said exit end as shown in Fig. 3.

In operation when the sprayer has been brought to the desired location for spraying, motor 9 will be operated and pump 11 will be operated through the belt 10 which will rotate the driven pulley 11a which forms the driving means for the pump 11. Fluid will be forced by the pump from the tank 5 out through the outlet 11g and through the hose 12 and will be sprayed upon the desired trees or plants. As wheel 11a rotates the cams 11aa will successively enter between the teeth of gear 15 and due to the eccentricity of said cams each one will rotate said gear the distance between two of its teeth. Said gear will thus be rotated the distance of two teeth for each rotation of wheel 11a. It will be seen that as gear 15 rotates the engaged teeth move away from the cam 11aa. For this reason the cams were made somewhat higher at their exit ends so as to prolong the engagement of the same with the gear. As gear 15 is rotated and shaft 14 rotated the propeller 13 is operated at the desired speed and the fluid to be sprayed is kept properly agitated and mixed.

From the above description it is seen that applicant has provided a very simple, compact and efficient structure for operating the agitator in such a portable power spraying device. The mechanism is all kept closely together and the use of a belt and pair of pulleys for operating the agitator is not necessary. The structure is not only simple but one that is quite rugged and durable and needs no attention for keeping it in proper running order. The device has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. The combination with a portable power sprayer comprising a portable tank for containing fluid to be sprayed, a motor mounted on said tank, a discharge means for said fluid, a pump operated by said motor for propelling fluid from said receptacle to said discharge means, said pump comprising a belt pulley, an auxiliary bearing on said pump, a shaft journaled in said auxiliary bearing and extending downwardly into said receptacle, an agitator secured to said shaft in said receptacle, a gear secured to the upper end of said shaft at one side of said pulley and cams on the side of said pulley meshing with said gear to rotate the same and operate said agitator.

2. A sprayer construction comprising a receptacle for fluid to be sprayed, a pump for discharging fluid carried by said receptacle at the outer side thereof, said pump comprising a rotating member, a rotary agitator in said receptacle, an operating shaft carrying said agitator and extending upwardly to the outer side of said receptacle, a member secured to said shaft and engageable by said rotating member to rotate said shaft and operate said agitator, said first mentioned member having thereon a pair of substantially semi-circular cams and said second mentioned member constituting a gear between the teeth of which said cams pass to rotate said gear and shaft, said cams being of increasing height toward and at the portions thereof which are last in engagement with said gear.

HENRY E. BRANDT.
AXEL SORENSEN.